United States Patent [19]
Choquet

[11] Patent Number: 5,810,414
[45] Date of Patent: Sep. 22, 1998

[54] RECEPTACLE FOR ITEMS FORMING A STORAGE SPACE IN A DASHBOARD OF A VEHICLE

[75] Inventor: Alain Choquet, Gondecourt, France

[73] Assignee: Reydel Société Anonyme, Gondecourt, France

[21] Appl. No.: 693,165
[22] PCT Filed: Nov. 9, 1995
[86] PCT No.: PCT/FR95/01479
  § 371 Date: Sep. 20, 1996
  § 102(e) Date: Sep. 20, 1996
[87] PCT Pub. No.: WO96/18525
  PCT Pub. Date: Jun. 20, 1996

[30] Foreign Application Priority Data

Dec. 15, 1994 [FR] France ................................. 94 15355

[51] Int. Cl.[6] ...................................................... B60R 7/06
[52] U.S. Cl. ........................................................ 296/37.12
[58] Field of Search ............................. 296/37.12, 37.8; 224/628, 629, 630, 542, 633

[56] References Cited

U.S. PATENT DOCUMENTS

| 2,130,976 | 9/1938 | Stone | 224/628 |
| 2,517,757 | 8/1950 | Adlerstein | 224/633 |
| 4,109,955 | 8/1978 | Amann et al. | 296/37.12 |

FOREIGN PATENT DOCUMENTS

| 1073328 | 1/1960 | Germany | 296/37.12 |
| 361030442 A | 2/1986 | Japan | 224/542 |
| 961469 | 6/1964 | United Kingdom | 296/37.12 |

*Primary Examiner*—Gary C. Hoge
*Attorney, Agent, or Firm*—Harrison & Egbert

[57] ABSTRACT

The present invention is a receptacle for storing objects within a space within a vehicle, such as the dashboard area. The receptacle is intended for storing miscellaneous articles so as to be used as a glove compartment and the like. The receptacle is delimited by a set of faces which define an opening. One of the faces is formed of a deformable material. A stiffening frame is provided within the deformable material.

6 Claims, 1 Drawing Sheet

RECEPTACLE FOR ITEMS FORMING A STORAGE SPACE IN A DASHBOARD OF A VEHICLE

TECHNICAL FIELD

The present invention relates to a receptacle for items intended, in particular, to form as a storage space in a vehicle such as, a glove compartment or the like in a dashboard. It also relates to a process for manufacturing, by moulding, a dashboard having such a receptacle for items.

The present invention will thus find an application, in particular, in the field of fittings for vehicle passengers.

BACKGROUND ART

At the present time, receptacle for items such as glove compartments or the like, are formed by a shell of rigid material provided at the rear of a vehicle's dashboard.

Dashboards also serve, for instance, to conceal various items such as, electric cable ducting, ventilation devices or the like, the overall dimensions of which are laid down in specifications. These receptacles are of a complex shape and are provided with numerous recesses suitable for leaving free spaces for these items. The internal capacity of such recptacles is thus small, which often makes it impossible to put items therein, even when they are of small size.

Another drawback is that they are difficult to produce. Moulds of complex shapes are required in order to define the recesses. In addition, to preclude the risk of exceeding the size limits imposed by the other items present under the dashboard, which would prevent installation, additional clearances are provided for, thus further reducing internal capacity.

Finally, since the shell is rigid, mould stripping requirements necessitate deliberate limitation of the space that the receptacle could occupy behind the recesses in the mould stripping direction.

In addition, since the receptacle is rigid, any contact with the items placed behind the dashboard and liable to come into interference therewith will result in noise.

The object of the present invention is to provide a receptacle for items, as well as a process for manufacturing, by moulding a dashboard having such a receptacle, which overcome the aforementioned drawbacks and facilitate the storage of the items.

Another object of the present invention is to provide a receptacle for items, as well as a process for manufacturing, by moulding a dashboard having such a receptacle, which are compatible with the other items present behind the dashboard.

A further object of the present invention is to provide a receptacle for items, as well as a process for manufacturing, by moulding a dashboard having such a receptacle, which are easy to produce and install so as to cut down the cycle time.

Another object of the present invention is to provide a receptacle for items, as well as a process for manufacturing, by moulding a dashboard having such a receptacle, which permit swift changes of range.

A further object of the present invention is to provide a receptacle of limited weight.

Another object of the present invention is to provide a receptacle of an improved aesthetic appearance.

A further object of the present invention is to provide a receptacle which can be easily illuminated.

Further objects and advantages of the present invention will emerge in the course of the following description which is provided, however, only by way of example and is not intended to limit same.

SUMMARY OF THE INVENTION

The present invention relates to a receptacle for items intended, to constitute a storage space in a vehicle such as, a glove compartment or the like, for instance in a dashboard. The receptacle is being delimited by a set of faces defining an opening. The receptacle has a bracing framework and at least one of the faces is formed by at least one deformable material.

The present invention also relates to a process for manufacturing, by moulding, a dashboard having such a receptacle for items. The receptacle is intended to form a storage space in a vehicle, such as, a glove compartment or the like. The receptacle is defined by faces forming an opening.

There is provided a framework for bracing the receptacle;

The dashboard and the bracing framework are moulded simultaneously;

At least one of the faces is constituted by at least one deformable material.

The invention will be more readily understood with reference to the following description as well as to the annexed drawings, which form an integral part thereof.

DETAILED DESCRIPTION OF THE INVENTION

The invention relates to a receptacle for items intended to form a storage space in a vehicle such as a glove compartment or the like in a dashboard. It also relates to a process for manufacturing, by moulding, a dashboard having such a receptacle for items.

The present invention will thus find an application, in the field of accessories for vehicle passengers.

However, such applications are not limitative, and the present invention will also find a use in all sectors of economic activity in which there is occasion to encounter boxes, boots, covers or the like, for storing items having varying sizes, shapes or functions.

Figure 1:
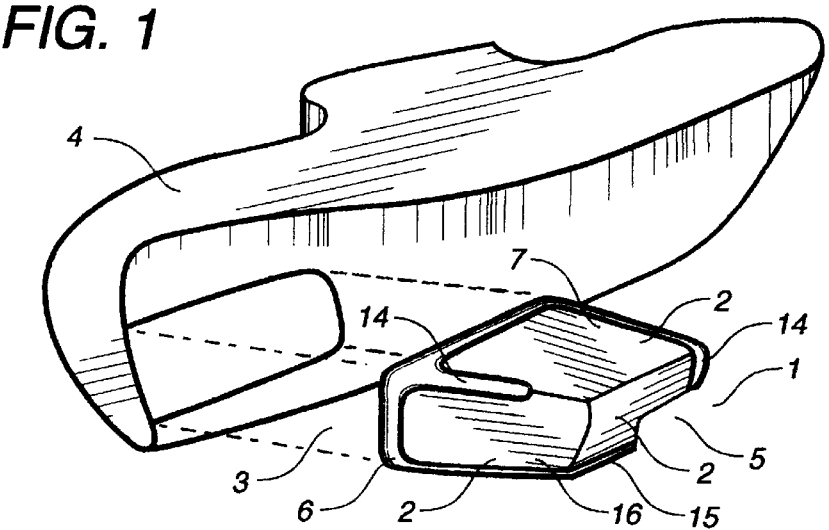
FIG. 1 is a perspective view of an example of a form of embodiment of a receptacle according to the invention provided behind a dashboard. The receptacle for items and the dashboard are represented in an exploded view.

FIG. 1 illustrates an example of a form of embodiment of a receptacle 1 for items, according to the invention. It is delimited by a set of faces 2, which are quadrangular defining an opening 3.

The receptacle 1 is provided, on a fixed support connected to a vehicle, such as, at the rear of a dashboard 4. According to this example of application, it is provided, with recesses 5 which leave free space for other items present behind the dashboard of a vehicle.

According to the invention, receptacle 1 comprises a bracing framework 6. In addition, at least one of the faces 2 is formed by a deformable material 7.

Figure 2:
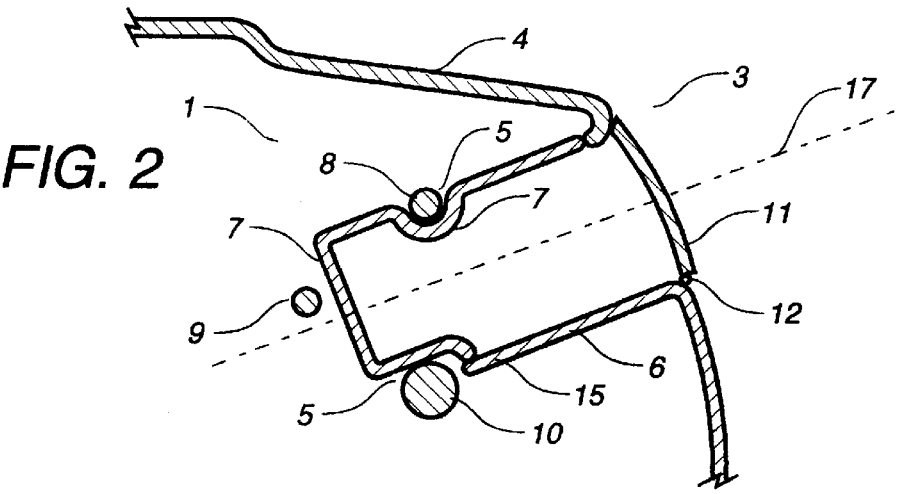
FIG. 2 is a cross-sectional view, in a longitudinal direction, illustrating the principle of cooperation of the receptacle of FIG. 1, with other items also present behind the dashboard of a vehicle.

As shown in FIG. 2, the deformable nature of certain of the faces 2 of receptacle 1 according to the invention makes it possible to deviate, after installation, around external items 8–10 such as, in the case of an application to vehicle dashboards 4, ducting for electric cables, ventilation devices or others, also present behind the dashboard 4.

The internal space of receptacle 1 is thus increased in relation to the space that would be afforded by a receptacle with a rigid shell. In the case of the external item numbered 8, owing to the mould stripping requirements of a rigid shell type receptacle equivalent to the receptacle according to the invention, it would not be possible to return to the initial internal cross-section behind external item 8.

In addition, the use of a deformable material 7 makes it possible to reduce installation clearances since the faces 2 formed thereby can match the contours of the external items 8–10 and, because of their flexibility, they will not create any noise in the event of interference with items 8–10 placed behind the dashboard.

According to one form of embodiment, opening 3 is closed, by a shutter or flap 11 articulated about a hinge 12. Other closing devices, such as the one functioning according to the principle of a container swinging about an axis of the "bread bin" type, can also be contemplated.

Figure 3:
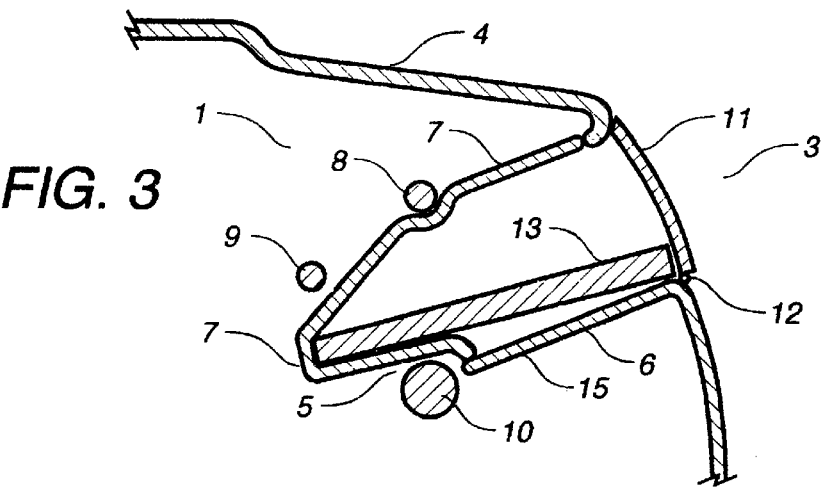
FIG. 3 is a cross-sectional view, similar to that of FIG. 2, illustrating the principle of deformation of one of the faces of the exemplary receptacle shown through the effect of an object that it contains.

Referring now to FIG. 3, it will be noted that receptacle 1 according to the invention makes it possible to to store items 13 that are larger than those that could have been placed in an equivalent receptacle with a rigid shell, unless shutter 11 were left open. According to the invention, since certain of the faces 2 are deformable, these are stretched out between external items 9, 10. For this purpose, material 7 which forms them is endowed with properties of resistance to tearing and perforation.

According to one particular form of embodiment, the bracing framework 6 of the receptacle 1 includes angle pieces 14, or similar means, defining, at least partially, edges on the receptacle 1. It may, for example, be formed by at least one of the faces 2 constituting a rigid wall 15 of receptacle 1.

It can, be the face 2 on which the items rest through the effect of gravity.

The framework can also be formed by a combination of these techniques or by other bracing systems such as upper hooks or suspension straps.

Bracing framework 6 can further include, rods suitable for reinforcing the structure of receptacle 1 at critical points, other than the edges.

According to one form of embodiment, deformable material 7 is an elastic and/or textile material. It can be decorated, as applicable, or, if it is not located in a visible area, it can be formed of a recyclable material. Its lightness makes for an advantageous weight saving in applications connected with the field of transport.

As to the material of bracing framework 6, this can be polypropylene, possibly covered by a skin formed, of polyvinyl chloride or polypropylene.

According to one particular exemplary form of embodiment, the deformable faces 2 are constituted by a cover 16 fixed to bracing framework 6. This can be effected by gluing.

According to another form of embodiment, the means for fixing the cover 16 to bracing framework 6 are removable. This enables the user to change the aesthetic appearance of receptacle 1 at will and thus harmonize it, with the interior trim of the vehicle. In addition, this will facilitate changes of range during production.

According to the invention, one of the deformable materials 7 is, for example, translucent. Thus, at least one of faces 2 and/or at least one portion of a face 2 has a translucent area. Consequently, it is no longer necessary to provide for a lighting device in the region of the walls of receptacle 1. A light source placed, externally, opposite the translucent area will, in fact, suffice. This will facilitate the design and manufacture of receptacle 1 according to the invention.

The translucent material can, be transparent.

The present invention also relates to a process for manufacturing, by moulding, a dashboard 4 having a receptacle 1 such as described hereabove. According to this process, there is provided a framework 6 for bracing the receptacle 1, and dashboard 4 and bracing framework 6 are moulded simultaneously, using injection moulding. In addition, at least one of faces 2 delimiting receptacle 1 is constituted by at least one deformable material 7.

Bracing framework 6, formed by angle pieces 14, or the like, and/or rigid walls 15, is orientated, in a direction 17 which is the direction of mould stripping.

The manufacture, by moulding, of a dashboard 4 having a receptacle 1, added by secondary moulding, can also be contemplated.

It is also possible to mould separately dashboard 4 and bracing framework 6, which then includes a rigid frame around an opening 3. The frame is provided with orifices cooperating with fixing means provided on the rear of dashboard 4.

It goes without saying that other embodiments of the present invention, within the grasp of a man of the art, could also have been contemplated without thereby departing from the scope of the present application.

I claim:

1. A receptacle for items forming a storage space in a vehicle in an area of a dashboard, the receptacle comprising a set of faces defining an opening, said set of faces joined together by a bracing framework, at least one face of said set of faces is constituted by a deformable material, said bracing framework having at least one face of said set of faces forming a rigid wall of the receptacle.

2. The receptacle according to claim 1, wherein said bracing framework has angle pieces defining, at least partially, edges of the receptacle.

3. A receptacle for items forming a storage space in a vehicle in an area of a dashboard, the receptacle comprising a set of faces defining an opening, said set of faces joined together by a bracking framework, at least one face of said set of faces is constituted by a deformable material, said deformable material being an elastic material.

4. The receptacle according to claim 1, wherein said deformable material is a textile material.

5. The receptacle according to claim 1, wherein the face constituted by the deformable material is a cover fixed to the bracking framework.

6. The receptacle according to claim 1, wherein said deformable material is translucent.

* * * * *